United States Patent [19]
Mitsuya et al.

[11] Patent Number: 5,466,197
[45] Date of Patent: Nov. 14, 1995

[54] MECHANICAL-HYDRAULIC TRANSMISSION

[75] Inventors: Hiroyuki Mitsuya; Hideki Yamada; Ryoichi Maruyama; Tsutomu Ishino, all of Ishikawa, Japan

[73] Assignee: Kabushiki Kaisha Komatsu Seisakusho, Tokyo, Japan

[21] Appl. No.: 64,002

[22] PCT Filed: Nov. 29, 1991

[86] PCT No.: PCT/JP91/01674

§ 371 Date: May 24, 1993

§ 102(e) Date: May 24, 1993

[87] PCT Pub. No.: WO92/09830

PCT Pub. Date: Jun. 11, 1992

[30] Foreign Application Priority Data

Nov. 30, 1990 [JP] Japan .................................. 2-330214

[51] Int. Cl.⁶ .................................................. F16H 47/04
[52] U.S. Cl. ................................................. 475/72; 475/80
[58] Field of Search ................................... 475/72, 80, 81, 475/248

[56] References Cited

U.S. PATENT DOCUMENTS

| 3,426,621 | 2/1969 | Mooney, Jr. . | |
| 5,222,921 | 6/1993 | Garcia | 475/72 |

FOREIGN PATENT DOCUMENTS

| 50-136571 | 10/1975 | Japan . | |
| 50-153170 | 12/1975 | Japan . | |
| 54-35560 | 3/1979 | Japan . | |
| 1-56279A | 3/1989 | Japan . | |
| 1-56278A | 3/1989 | Japan . | |
| 2-14979 | 1/1990 | Japan . | |
| 2-37081A | 2/1990 | Japan . | |
| 2-66361 | 3/1990 | Japan . | |
| 5-33861 | 2/1993 | Japan | 475/72 |
| 2261039 | 5/1993 | United Kingdom | 475/72 |

*Primary Examiner*—Edward K. Look
*Assistant Examiner*—James A. Larson
*Attorney, Agent, or Firm*—Armstrong, Westerman, Hattori, McLeland and Naughton

[57] ABSTRACT

A mechanical - hydraulic transmission for a crawler-type vehicle is provided having a reduced dimension in a widthwise direction perpendicular to input/output shafts and capable of ready installation on an existent crawler steering device. The transmission is arranged such that a power input shaft (1), directly connected to a prime mover, an intermediate shaft (9) and an output shaft (19), are concentrically related and arranged in a longitudinal column. Normal- and reverse-rotation planetary gear devices (5, 6), having respective clutches (7, 8) thereof, are mounted on a periphery of the power input shaft (1), and the power input shaft (1) is connected to a variable displacement hydraulic pump (2). A plurality of planetary gear trains (11, 12) having respective clutches (10, 13, 14) and a single planetary differential gear (15) are mounted on a periphery of the intermediate shaft (9), and an output side of the variable displacement hydraulic motor unit (20), driven by the hydraulic pump (2) and the output shaft (19), are connected to the planetary differential gear (15).

3 Claims, 3 Drawing Sheets

MECHANICAL-HYDRAULIC TRANSMISSION

DESCRIPTION

1. Technical Field

This invention relates to a mechanical - hydraulic transmission which is capable of selecting a plurality of driving speed modes in respective driving in forward- and rearward-movement directions.

2. Background Art

As a conventional transmission of the kind referred to above, transmissions are known which are disclosed in respective specifications of U.S. Pat. No. 3,426,621 and Japanese Patent Laid-Open No. HEI 2 - 14979.

Each of these publicly known forward- and rearward-movement multi-stage transmitting mechanical - hydraulic transmissiones is so arranged as to be provided with a mechanical power transmitting section of two- shaft parallel type.

The above-described former is so arranged that a transmitting section which modifies or alters a rotational direction and rotational speed of inputted power is installed on a mechanical transmitting power input system shaft which lays down so as to extend perpendicular to a longitudinal direction (fore and aft directions) of a vehicle body, a power output shaft system is juxtaposed in parallel with a mechanical power input system shaft, and mechanical - hydraulic transmitting power is outputted in a power output shaft system direction.

Further, the latter of the aforesaid prior art is arranged such that a power transmitting system shaft lays down so as to extend perpendicular to a longitudinal direction of a vehicle body, a mechanical transmitting section for changing or modifying a rotational direction and rotational speed of inputted power and a differential planetary gear mechanism of composition of mechanical - hydraulic powers are installed in series in the axial direction, and a static hydraulic transmitting device is juxtaposed in parallel to the power transmitting system shaft, to output the mechanical - hydraulic transmitting power to both sides in a widthwise direction of the vehicle body.

In short, any one of these mechanical - hydraulic transmissions of the prior art is provided with crawler-belt steering devices of crawler-type vehicles on both outsides of the transmitting output system shafts, to exhibit transmitting and steering function.

In the above-mentioned prior art, in a manner in which mechanical - hydraulic transmitting power is outputted on both sides in the widthwise direction of the vehicle body, and the crawler-belt steering devices are equipped on both sides of the output shaft, wide housing or storage space is required in the widthwise direction of the vehicle body. This makes difficult loading of the transmission to an existent production vehicle.

Such mechanical - hydraulic transmission has the following problems and the like. That is, since the crawler-belt steering device is brought to exclusive one, it is impossible to combine the mechanical - hydraulic transmission with the existent crawler-belt steering device, there is no loading interchangeability with other existent transmitting devices with respect to the same or identical rank vehicle, and the like.

Furthermore, the above-described prior art is an arrangement in which a single clutch exclusive for each speed ratio is engaged, to thereby form a speed condition. For this reason, power transmitting paths extending from the input shaft to a differential gear are required only for the number of speed ratios in parallel relation to each other. In a case where arrangements each having such clutch arrangement are disposed on a single shaft so as to be capable of being loaded on an already existent production vehicle, since power transmission between the input shaft and the differential gear is brought to a multiple hollow shaft, an arrangement thereof is complicated.

SUMMARY OF THE INVENTION

The invention has been done in view of the above, and an object of the invention is to provide a mechanical - hydraulic transmission for a crawler-type vehicle, in which dimension in a widthwise direction is reduced; there is loading interchangeability with other speed-change transmitting devices with respect to crawler-belt vehicles having the same vehicle rank; and it is possible to freely select combination with an existent crawler-belt steering device.

In order to achieve the above-described objects, according to a main or chief mode of the invention, there can be provided a mechanical - hydraulic transmission comprising a mechanical power transmitting device and a static hydraulic power transmitting device arranged in parallel between a prime mover and an output shaft, in order to transmit power of the prime mover to the output shaft in a manner of infinite variable-speed transmission, wherein the mechanical power transmitting device consists of a plurality of columns of planetary gear trains and connected to a power input shaft directly connected to the prime mover, wherein the static hydraulic power transmitting device consists of a variable displacement hydraulic pump driven by the power from the power input shaft, and a hydraulic motor unit driven by the pump for outputting the power to one of the planetary gear trains of the mechanical power transmitting device, characterized in that the mechanical power transmitting device is provided with three shafts disposed under three-piece fashion with respect to a concentric direction, that is, a power input shaft, an intermediate shaft and an output shaft, that the power input shaft is provided with a normal- rotation and reverse-rotation input means in which normal- and reverse-rotational planetary gear devices are concentrically arranged for changing the input rotating direction of the power of the prime mover to a normal rotating direction and a reverse rotating direction for outputting the power selectively to the intermediate shaft; that the intermediate shaft is provided with a power transmitting system which is the intermediate shaft per se, a planetary gear transmitting system arranged concentrically on the intermediate shaft, and a planetary differential gear for connecting output sides of the respective transmitting systems to the output shaft through a plurality of columns of planetary gear elements; that, on the other hand, the static hydraulic power transmitting device is provided with a gear train for connecting the output shaft of the hydraulic motor unit to the planetary gear element of the planetary differential gear; that the planetary gear transmitting system provided in the intermediate shaft is provided with clutch means for driving the output shaft only by the planetary differential gear which is operated by the static hydraulic power transmitting device in one driving mode, and both clutch means for selecting modification or change of the rotational direction which is done by the normal and reverse input means and clutch means for selecting modification or change of speed ratio which is done by the power transmitting system which is the intermediate shaft per se, the planetary gear transmitting system and the planetary transmitting gear due to the intermediate shaft are provided in other driving modes; and that combination thereof has a plurality and same number of speed gear ratios both in normal- and reverse-rotation.

In the above-mentioned mechanical - hydraulic transmission of the apparatus according to the invention, the power from the prime mover is transmitted both by the static hydraulic power transmitting device and the mechanical power transmitting device. Power from both power transmitting devices are transmitted to the output shaft through the planetary differential gear of the mechanical power transmitting device.

A first speed ratio of forward and reverse movements is performed only by operation of the static hydraulic power transmitting device under a condition that a first-speed ratio clutch of the mechanical power transmitting device is engaged. Moreover, second and third speed ratios for forward and reverse movements are performed by the fact that forward-movement or rearward-movement clutch of the mechanical power transmitting device is selectively engaged, clutches for second and third speed ratios are selectively engaged, and in parallel therewith, the power from the static hydraulic power transmitting device is inputted to the planetary differential gear of the mechanical power transmitting device.

At this time, both powers are composited by the planetary differential gear and are transmitted to the output shaft.

According to the mechanical - hydraulic transmission of the invention, the arrangement is such that the power input shaft thereof, the intermediate shaft and the output shaft are arranged in series on the same axis. Thus, the following advantages can be produced. That is, it is possible to narrow or reduce the lateral dimension of the transmission portion similarly to the conventional mechanical transmission. The mechanical - hydraulic transmission can be loaded onto a crawler-type vehicle such as a bulldozer or the like without great or large design modification or alteration. Furthermore, there is loading interchangeability with other transmission transmitting devices with respect to the crawler-type vehicle of the same vehicle level, and it is possible to freely select combination with existent crawler steering device.

The aforesaid and other objects, modes and advantages of the present invention will become apparent to one skilled in the art, by the description with reference to the following description and the attached drawings in which a preferred specific embodiment coincident with the principle of the present invention is indicated as an embodiment.

DETAILED DESCRIPTION OF THE PREFERRED EMBODIMENTS

Figure 1:
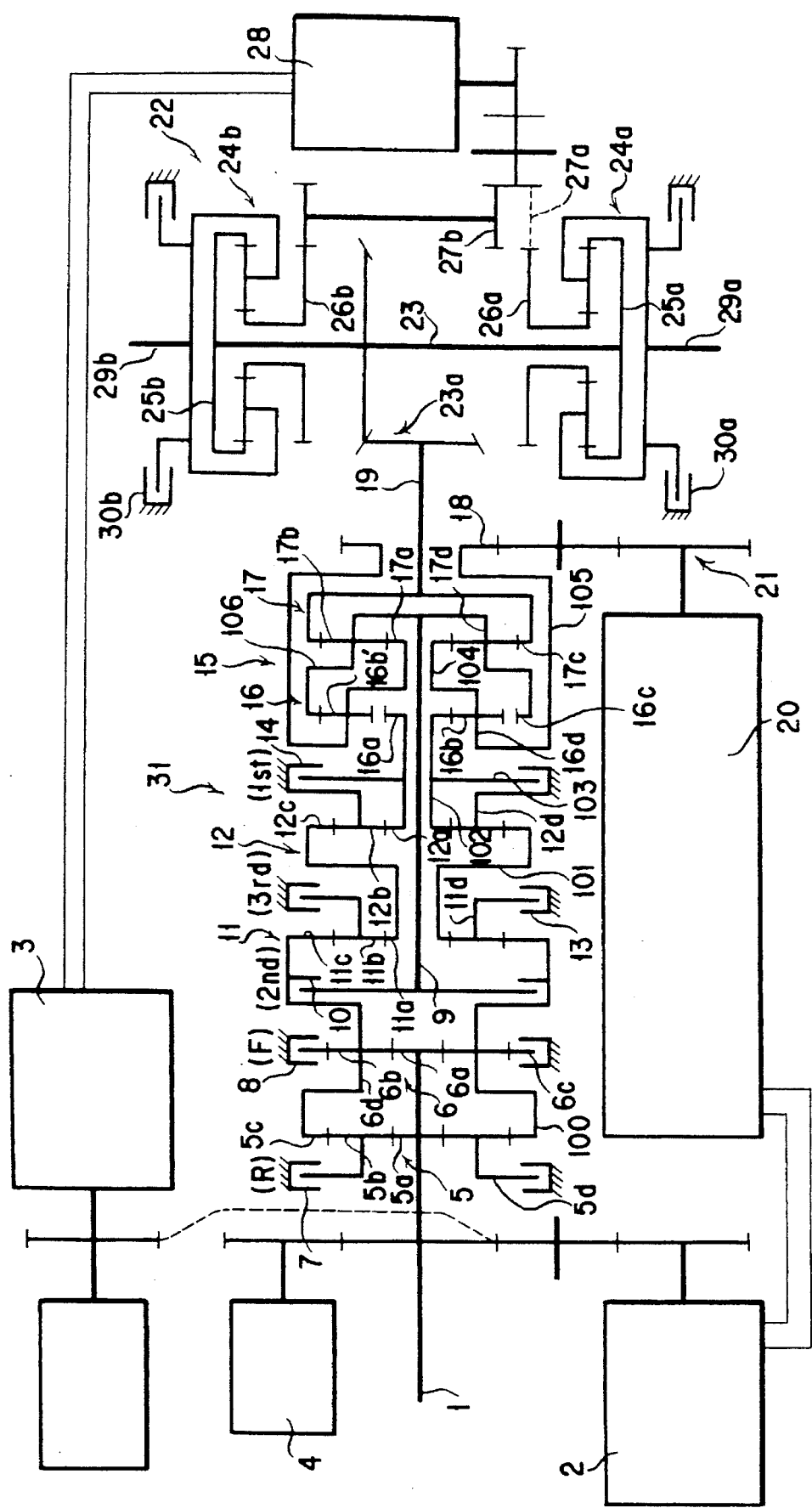
FIG. 1 is an entire schematic arrangement view showing a specific embodiment of the invention.

An embodiment of the invention will hereunder be described in detail with reference to the accompanying drawings.

In the figure, the reference numeral 1 denotes a power input shaft of a mechanical - hydraulic transmission which is connected in series concentrically to an output shaft of a prime mover (not shown); and 2 and 3, first and second variable displacement hydraulic pumps, respectively, which are connected to the power input shaft 1 through gear trains. The pump 3 is utilized as a pump for hydraulic steering. The reference numeral 4 denotes a charge pump which is connected to the power input shaft 1 through a gear train.

The power input shaft 1 is provided with two planetary gear trains, that is rearward-movement (reverse-rotation) and forward-movement (normal-rotation) planetary gear trains 5 and 6 in an axial direction of the power input shaft 1.

The rearward-movement planetary gear train 5 comprises a sun gear 5a connected to the power input shaft 1, a carrier 5d provided with a rearward-movement clutch 7 for being selectively arrested or restricted in free rotation, a planetary gear 5b supported by the carrier 5d and in mesh with the sun gear 5a and an annular internal gear 5c in mesh with the planetary gear 5b, to inhibit or suppress revolution of the planetary gear 5b and to transform a rotational direction from the sun gear 5a to a reversed direction to transmit the rotational direction from the annular gear 5c.

The forward-movement planetary gear train 6 comprises a sun gear 6a connected to the power input shaft 1, a carrier 6d integral with the annular gear 5c of the rearward-movement planetary gear train 5, a planetary gear 6b supported by the carrier 6d and in mesh with the sun gear 6a, and an annular internal gear 6c in mesh with the planetary gear 6b and provided with a forward-movement clutch 8 for selectively arresting free rotation, to arrest free rotation of the annular gear 6c and to rotate the carrier 6d in the same rotational direction as the sun gear 6a by rotation and revolution of the planetary gear 6b to thereby transmit the rotation.

The annular gears 5c and 6c of both the respective planetary gear trains 5 and 6 and a first connecting element 100 of the carrier 6d are included in a speed ratio change device. A clutch 10 for second gear speed, and first and second planetary gear trains 11 and 12 for third gear speed are arranged in series with respect to an axial direction.

The clutch 10 for second gear speed selectively connects the first connecting element 100 and an intermediate shaft 9 arranged concentrically and in series with respect to the power input shaft 1 to each other, to receive the power to the intermediate shaft 9.

The first planetary gear train 11 for third gear speed is in mesh with a planetary gear 11b in which the first connecting element 100 is brought to an annular internal gear 11c, and which is supported by a carrier 11d which is provided with a clutch 13 for third gear speed for selectively arresting or suppressing rotation of the annular internal gear 11c. The planetary gear 11b and sun gear 11a are in mesh with each other. Revolution of the planetary gear 11b is stopped. The sun gear 11a is driven at a speed-increasing ratio of the annular internal gear versus the sun gear. The power from the power input shaft 1 is received.

The received power is further speed-increased by the second planetary gear train 12 for third gear speed.

The second planetary gear train 12 for third gear speed consists of an annular internal gear 12c integrally connected to the sun gear 11a of the first planetary gear train 11 for third speed ratio through a second connecting element. 101, a fixed carrier 12d, a planetary gear 12b supported by the fixed carrier 12d and in mesh with the annular internal gear 12c, and a sun gear 12a in mesh with the planetary gear 12b. Power transmitted from the first planetary gear train 12 for third speed ratio through the second connecting element 101 rotates the planetary gear 12b, and is speed-increased by a speed-increasing ratio due to the annular internal gear versus the sun gear, to drive the sun gear 12a.

The power selectively received from the above-mentioned intermediate shaft 9 and sun gear 12a continues to the power output portion.

The power output portion is brought to a planetary differential gear 15. The planetary differential gear 15 consists of first and second differential planetary gear trains 16 and 17 which are arranged concentrically with respect to the intermediate shaft 9 on the output side of the intermediate shaft 9.

The first differential planetary gear train 16 of the planetary differential gear 15 is a double planetary gear type and includes a gear element in which double planetary gears 16b and 16b' in mesh with each other is arranged on a carrier 16d, one of the planetary gears 16b is in mesh with the sun gear 16a, and the other planetary gear 16b' is in mesh with an annular internal gear 16c.

Moreover, the second differential planetary gear train 17 is single planetary gear type and includes a sun gear 17a in mesh with a planetary gear 17b mounted on a carrier 17d, and a gear element of an annular internal gear 17c in mesh with the planetary gear 17b.

The sun gear 16a of the first differential planetary gear train 16 is integrated with the sun gear 12a of the second planetary gear train 12 for third gear speed by a tubular third connecting element 102, and is connected to a transmitting system of mechanical power. The third connecting element 102 has a clutch hub 103 which spreads in a radial direction substantially at an intermediate portion on the outer peripheral side thereof. The clutch hub 103 is engaged with a clutch 14 for first speed ratio.

The carrier 16d of the first differential planetary gear train 16 is joined or coupled to the sun gear 17a of the second differential planetary gear train 17 through the fourth connecting element 104, and is further connected to a variable displacement hydraulic motor unit 20 of the static hydraulic power transmitting device through a fifth connecting element 105 and a gear train 21 including a gear 18 integrated with the fifth connecting element 105. The first and second differential planetary gear trains 16 and 17 introduce the power due to the static hydraulic power transmitting device into an input system.

The second differential planetary gear train 17 connects a carrier 17d to the intermediate shaft 9, and is coupled to a transmitting system of mechanical power of a different system. Furthermore, the annular internal gear 17c is coupled to an output shaft 19.

Further, the first and second differential planetary gear trains 16 and 17 connect the annular internal gear 16c of the first differential planetary gear train 16 and the carrier 17d of the second differential planetary gear train 17 to each other through a sixth connecting element 106 by connection or joint.

The output shaft 19 is located in a direction concentric with the intermediate shaft 9 and in series therewith, and has a bevel gear 23a at a shaft end.

The variable displacement hydraulic motor unit 20 is connected to the variable displacement hydraulic pump 2 by piping.

The reference numeral 22 denotes a steering device. The steering device 22 has an input shaft 23 which is disposed in triangle with respect to the output shaft 19 of the planetary differential gear 15, and is connected to the output shaft 19 by the bevel gear mechanism 23a. A pair of left- and right-hand steering differential planetary gear trains 24a and 24b are arranged respectively on both sides of the input shaft 23 in the axial direction. The input shaft 23 has ends thereof which are connected respectively to first input elements 25a and 25b of the respective gear trains 24a and 24b. One 26a of second input elements 26a and 26b of the respective gear trains 24a and 24b is connected to an output shaft of a steering hydraulic motor 28 through the normal-rotation gear train 27a.

The other second input element 26b is connected to the output shaft of the steering hydraulic motor 28 through a reverse-rotation gear train 27b. Output shafts 29a and 29b of the respective steering differential planetary gear trains 24a and 24b are connected respectively to left- and right-hand drive driving wheel shafts (not shown). The reference numerals 30a and 30b denote left- and right-hand brakes, respectively. The second hydraulic motor 28 is connected to the second variable displacement hydraulic pump 3 through piping, and is driven by delivery hydraulic pressure of the pump 3.

Figure 3:
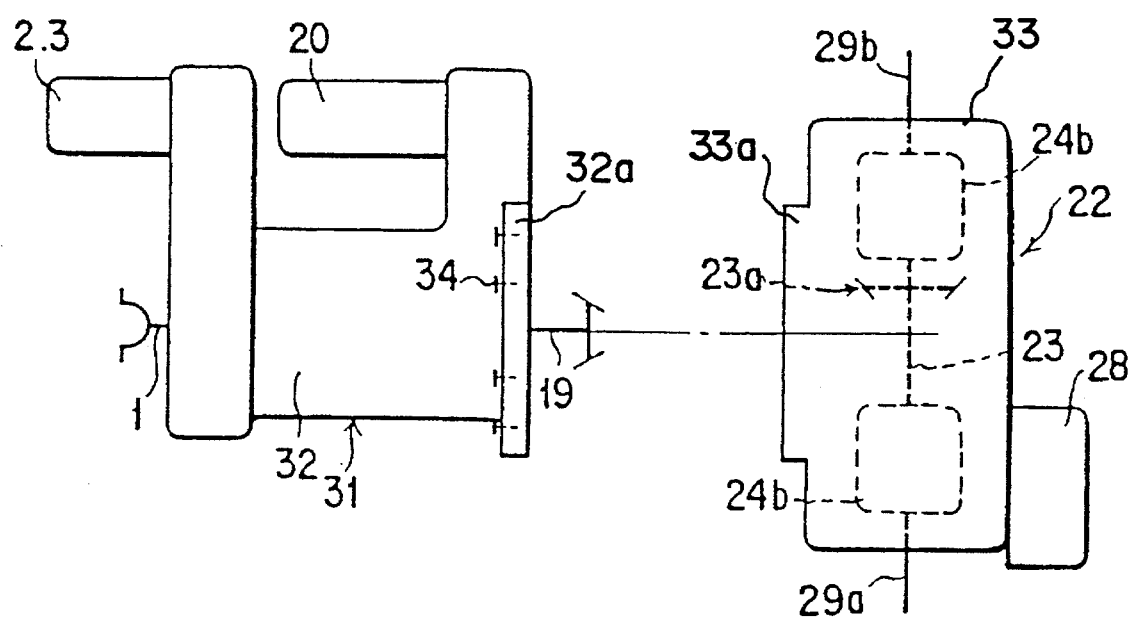
FIG. 3 is a schematic arrangement view for explanation, showing a transmission and a steering device in separation.

In the above-described constitutional elements, the rearward-movement and forward-movement planetary gear trains 5 and 6 from the power input shaft 1, the other planetary gear trains 11, and 12, the clutches 13 and 14, and the planetary differential gear 15 are accommodated within a case 32 as parts of a mechanical power transmitting device 31 as shown in FIGS. 1 and 3.

Further, the steering device 22 is similarly accommodated within a single case 33 as shown in FIG. 3.

A rearward end portion of the case 32 of the mechanical power transmitting device 31 and a front end portion of the case 33 of the steering device 22 are provided respectively with flange portions 32a and 33a which are engageable with and disengageable from each other. Both the flanges 32a and 33a are joined to each other by bolts 34 engagingly and disengagingly.

Operation of the mechanical - hydraulic transmission arranged as described above will be described.

The mechanical - hydraulic transmission has three speed driving modes in each of the forward-movement and rearward-movement directions, and performs power transmission operation continuously variable in speed.

A first speed ratio driving mode is achieved by output speeds in the forward-movement direction and in the rearward-movement direction due only to the static hydraulic power transmitting device under a condition that the clutch 14 for first speed ratio is engaged, and the clutches 10 and 13 for second speed ratio and third gear speed capable of selective operation are released or under a condition that the first gear speed and second speed ratio clutches 14 and 10 are engaged, and the third speed ratio clutch 13 is released.

A second speed ratio driving mode is achieved by a mechanical - hydraulic second speed ratio mode in which the clutch 14 for first speed ratio and the clutch 13 for third speed ratio are released, and either one of the forward- and rearward-movement clutches 7 and 8 for selecting the rotational direction of the input power due to the mechanical power transmitting device and the two clutches of the clutch 10 for second speed ratio are engaged with each other.

A third speed ratio driving mode is achieved by a mechanical - hydraulic third speed ratio mode in which the clutch 14 for first speed ratio and the clutch 10 for second speed ratio are released, and either one of the forward- and rearward-movement clutches 7 and 8 for selecting the rotational direction of the input power due to the mechanical power transmitting device and two clutches of the clutch 13 for third gear speed ratio are engaged with each other.

Operation of the static hydraulic power transmitting device in the above-described operation will next be described.

(1) The variable displacement hydraulic pump 2 of the static hydraulic power transmitting device is of alternating variable displacement type. The variable displacement hydraulic motor unit 20 is of one-side variable displacement type, and an exit and an entrance thereof communicate with each other (in the following description, the variable displacement hydraulic pump and the variable displacement hydraulic motor unit will be referred simply to "pump" and "motor unit", respectively).

When swash-plate angle of the pump 2 is inclined in a positive direction from 0° under the condition that the swash-plate angle of the motor unit 20 is the maximum (maximum in displacement), the number of revolution of the motor unit 20 increases from 0 in the positive direction. If the swash-plate angle of the motor unit 20 is reduced under the condition that the swash-plate angle of the pump 2 is the maximum, the number of revolution of the motor unit 20 further increases.

Reversely, when the swash-plate angle of the pump 2 is inclined in the negative direction from 0°, the number of revolution of the motor unit 20 is reduced from 0 in the negative direction.

In this manner, it is possible to vary a motor speed ratio (a value in which the number of revolution of the motor is divided by the number of revolution of the power input shaft 1) in a infinite variable-speed manner from normal rotation to reverse rotation.

Alternatively, the second speed ratio clutch 10 may be engaged in addition to the first speed ratio clutch 14 upon the above-described first gear speed operation.

By doing so, a speed ratio of the output shaft upon the first speed ratio is brought to specific values $e_{F1}$ (at forward movement) and $e_{R1}$ (at rearward movement). When the relative number of rotation of the forward-movement clutch 8 or the rearward-movement clutch 7 is brought to 0, the respective clutches are engaged, and the first gear speed clutch 14 is released, whereby a condition is smoothly brought to the two gear speed condition including the forward movement and the rearward movement.

(2) In forward- and rearward-movement first speed ratio (F1, R1), the transmission is performed only by the static hydraulic power transmitting device.

That is, only the clutch 14 for first speed ratio (1st) is engaged. By doing so, the sun gear 16a of the first differential planetary gear train 16 of the planetary differential gear 15 is fixed or stationary.

Under this condition, the power from the motor unit 20 is inputted to the input gear 18 of the planetary differential gear 15 from the gear train 21, and is transmitted to the output shaft 19 successively through the carrier 16d, the double planetary gears 16b and 16b' and the link gear 16c of the first differential planetary gear train 16, and the carrier 17d, the planetary gear 17b and the ring gear 17c connected to the output shaft 19, of the second differential planetary gear train 17.

When the velocity or speed ratio of the motor unit 20 increases in a positive direction from 0 under this condition, the speed ratio is transmitted to the output shaft 19 through the two columns of differential planetary gear trains 16 and 17 of the planetary differential gear 15. The number of revolution of the output shaft 19 increases from 0 in the positive direction. Conversely, when the motor speed ratio decreases from 0 in the negative direction, the number of revolution of the output shaft 19 decreases from 0 in the negative direction.

In this manner, it is possible to vary the speed ratio of the output shaft of the static hydraulic power transmitting device (a value in which the number of revolution of the output shaft 19 is divided by the number of revolution of the power input shaft 1) within positive and negative ranges in an infinite variable-speed manner.

Figure 2:
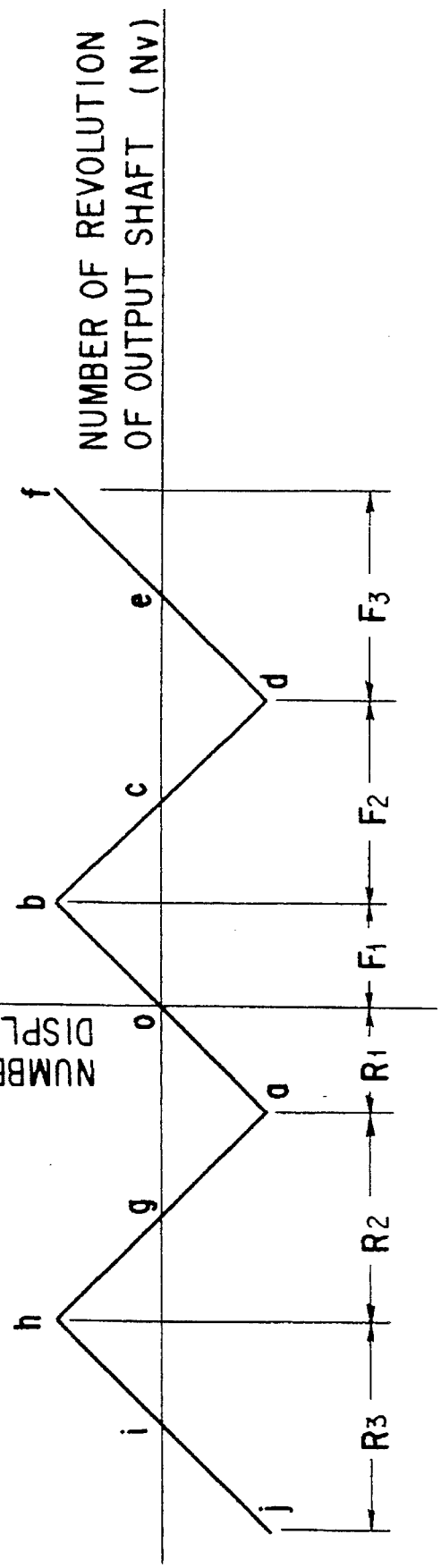
FIG. 2 is a diagram showing the relationship of the number of revolutions of a variable displacement hydraulic motor unit with respect to the number of revolutions of an output shaft.

FIG. 2 indicates the number of revolution Nv of the output shaft 19 with respect to variation in the number of revolution of the motor unit 20. In the differential of first gear speed, the number of revolution N of the motor unit 20 is controlled along a– b, whereby the number of revolution Nv of the output shaft 19 can be controlled to the forward- and rearward-movement first speed ratio from 0.

In connection with the above, in a case of forward movement at operation of the first gear speed, the forward-movement clutch 8 may be engaged. While, in a case of the rearward movement, the rearward-movement clutch 7 may be engaged. By doing so, the speed ratio of the output shaft at the first speed ratio is brought to specific values $e_{F1}$ (at forward movement) and $e_{R1}$ (at rearward movement). When the relative number of revolution of the clutch 10 for second speed ratio of the forward movement or the rearward movement is brought to 0, the clutch 10 for second speed ratio is engaged, and the clutch 14 for first speed ratio is released, whereby the vehicle is smoothly brought to a two-speed condition including the forward movement or the rearward movement.

(3) On the side of low speed of forward-movement second speed ratio (F2):

The first speed ratio (1st) clutch 14 is released beyond the first speed range under the forward-movement first speed ratio control, and the forward-movement (F) clutch 8 and the second speed ratio (2nd) clutch 10 are engaged with each other, whereby a condition is brought to the forward-movement second speed ratio condition.

By doing so, the power of the power input shaft 1 is reduced in speed and is transmitted from the forward-movement planetary gear train 6 to the intermediate shaft 9 through the second speed ratio clutch 10. By the intermediate shaft 9, the reduced speed is outputted to the output shaft 19 integral with the annular internal gear 17c, from the carrier 17d of the second differential planetary gear train 17 of the planetary differential gear 15 through the planetary gear 17b.

Further, at this time, a reaction force occurring in the planetary differential gear 15 is transmitted from the planetary gear 17b of the second differential planetary gear train 17 to the input gear 18 of the differential gear 15 through the sun gear 17a and the carrier 16b of the second differential planetary gear train 16. By doing so, the output shaft of the motor unit 20 is driven in a reverse direction. The power due to the reaction force of the planetary differential gear 15 is returned to the input shaft 1 through the variable displacement hydraulic pump 2.

That is, under the condition that the motor speed ratio is positive at the forwards-movement second speed ratio, the motor unit 20 performs a pumping action to drive the pump 2, and is composited with the power from the power input shaft 1, to transmit the power to the planetary differential gear 15. A part of the power from the differential gear 15 drives the motor unit 20, and the remaining power drives the output shaft 19.

Revolution of the motor unit 20 at this time changes or varies along b–c in FIG. 2. The point c is a position where the swash plate of the motor unit 20 is brought to neutral, and the number of revolution thereof is brought to zero.

(4) On the side of high speed of the forward-movement second speed ratio (F2):

When the number of revolution of the motor unit 20 varies along c–d in FIG. 2 so that the speed ratio decreases, the output shaft 19 increases in speed so as to be brought to the side of the high speed of second speed ratio.

That is, when the motor speed ratio is under the negative condition, a part of the power from the power input shaft 1 drives the pump 2, and is transmitted to the planetary differential gear 15 through the motor unit 20. The remaining power is transmitted to the planetary differential gear 15 through the gear train. At the planetary differential gear 15, both the powers are composited to drive the output shaft 19.

(5) On the side of low speed of forward-movement third speed ratio (F3):

In the forward-movement second gear speed control, when the speed ratio of the motor unit 20 is decreased so that the speed ratio of the output shaft is brought to the specific value $e_{F2}$, the relative number of revolution of the third speed ratio clutch 13 is brought to 0. At this time, the third gear speed clutch 13 is engaged, and the second speed ratio clutch 10 is released, whereby a condition is brought to a third speed ratio condition.

By doing so, the power of the power input shaft 1 is inputted to the sun gear 16a of the first differential gear train 16 of the planetary differential gear 15 from the forward-movement planetary gear train 6 through the third gear speed first planetary gear train 11 and the second planetary gear train 12. In the planetary differential gear 15, the power is composited by the first and second differential gear trains 16 and 17 and is transmitted to the output shaft 19. Under this condition, when the motor speed ratio increases, the number of revolution of the output shaft 19 increases.

The number of revolution of the motor unit 20 at this time varies along d–e in FIG. 2.

In this manner, under a condition that the motor speed ratio is negative at the forward-movement third gear speed, the motor unit 20 performs the pumping action to drive the pump 2. The power is composited with the power from the power input shaft 1 and is transmitted to the first planetary gear train 16 of the planetary differential gear 15. A part of the power from the first planetary gear train 16 drives the motor unit 20, and the remaining power drives the output shaft 19 through the second planetary gear train 17.

(6) On the side of high speed of forward-movement third speed ratio (F3):

When the rotational direction of the motor unit 20 changes to the normal rotation and varies along e–f in FIG. 2, that is, under the condition that the motor speed ratio is positive at the forward-movement third speed ratio, a part of the power from the power input shaft 1 drives the pump 2, and is transmitted to the first planetary gear train 16 of the planetary differential gear 15 through the motor unit 20. The remaining power is transmitted similarly to the first planetary gear train 16 of the differential gear 15 through each of the planetary gear trains. The powers are composited at the first planetary gear train 16 to drive the output shaft 19 through the second planetary gear train 17.

When the motor speed ratio decreases at the forward-movement third speed ratio so that the speed ratio of the output shaft is brought to the specific value $e_{F2}$ (the same as the speed ratio at which switching is made from the forward-movement second speed ratio to the forward-movement third speed ratio), the relative number of revolution of the second speed ratio clutch 10 is brought to 0. At this time, when the second speed ratio clutch 10 is engaged and the third speed ratio clutch 13 is released, a condition is brought to a forward-movement second speed ratio.

The above-described operations (2), (3), (4) and (5) show the low speed side and the high speed side of the respective second speed ratio~third speed ratio on the side of the forward movement. However, the low speed side and the high speed side of the respective second speed ratio~third speed ratio on the side of the rearward movement is controlled similarly to the side of forward movement by the fact that the rearward-movement (R) clutch 7 is engaged in place of the forward-movement (F) clutch 6 with respect to the side of forward movement.

At this time, revolution of the motor unit 20 is such that, in FIG. 2, the low-speed side of rearward-movement second speed ratio (R2) changes along a–g, the side of high speed thereof changes along g–h, the low speed side of rearward-movement third speed ratio (R3) changes along h–i, and the high speed side thereof changes along i–j.

An example of the rearward-movement second speed ratio will hereunder be described as an example of the rearward-movement operation.

At the rearward-movement second speed ratio, the power from the power input shaft 1 decreases in speed through the rearward-movement planetary gear train 5 and the second speed ratio clutch 10 and is transmitted to the second planetary gear train 17 of the planetary differential gear 15. On the other hand, the power from the motor unit 20 also decreases and is transmitted to the second planetary gear train 17. At the second planetary gear train 17, the two powers are composited and are transmitted to the output shaft 19. Under this condition, when the motor speed ratio increases, the speed ratio of the output shaft 19 decreases in the negative direction.

Under the condition that the motor speed ratio is negative at the rearward-movement second speed ratio, the motor unit 20 performs the pumping action to drive the pump 2, and is composited with the power from the power input shaft 1 so that the power is transmitted to the second planetary gear train 17 of the planetary differential gear 15 through the rearward-movement planetary gear train 5 and the second speed ratio clutch 10. A part of the power from the second planetary gear train 17 drives the motor unit 20, and the remaining power drives the output shaft 19.

Furthermore, under the condition that the motor speed ratio is positive, a part of the power from the power input shaft 1 drives the pump 2 and is transmitted to the second planetary gear train 17 of the planetary differential gear 15 through the motor unit 20. The remaining power is transmitted to the second planetary gear train 17 through the rearward-movement planetary gear train 5 and the second speed ratio clutch 10. The powers are composited by the second planetary gear train 17 to drive the output shaft 19.

Under the condition of the rearward-movement second speed ratio, when the motor speed ratio increases so that the speed ratio of the output shaft is brought to the specific value $e_{R2}$, the relative number of revolution of the third speed ratio clutch 13 is brought to 0. At this time, if the third speed ratio clutch 13 is engaged and the second speed ratio clutch. 10 is released, a condition is brought to the rearward-movement third speed ratio.

Further, when the motor speed ratio decreases at the rearward-movement second speed ratio so that the speed ratio of the output shaft is brought to the specific value $e_{R1}$ (the same as the speed ratio at which switching is made from the rearward-movement first speed ratio to the rearward-movement second speed ratio), the relative number of revolution of the first speed ratio clutch 14 is brought to 0. At this time, when the first speed ratio clutch 14 is engaged and the second speed ratio clutch 10 is released, a condition is brought to a rearward-movement first speed ratio condition.

The power from the prime mover is transmitted to the output shaft 19 of the differential gear 15 in a manner described above. However, the output from the output shaft 19 is transmitted to the input shaft 23 of the steering device 22 through the bevel gear mechanism 23a, and is outputted to the left- and right-hand output shafts 29a and 29b through the left- and right-hand steering differential planetary gear trains 24a and 24b.

At this time, the left- and right-hand steering differential planetary gear trains 24a and 24b are controlled by the steering hydraulic motor 28, whereby a rotational difference occurs between the left- and right-hand output shafts 29a and 29b so that steering operation is performed.

Since the steering device 22 is such that the case 33 accommodating the same is mounted detachably with respect to the case 32 of the mechanical power transmitting device 31, it is possible to easily separate the case 33 from the case 32 of the mechanical power transmitting device 31. By doing so, the mechanical power transmitting device 31 and the steering device 22 can respectively be replaced with another one. In this connection, in this case, the bevel gear mechanism 23a which connects the output shaft 19 and the input shaft 23 to each other requires using the same one.

We claim:

1. A mechanical - hydraulic transmission including a mechanical power transmitting device and a static hydraulic power transmitting device arranged in parallel between a prime mover and an output shaft, in order to transmit power from said prime mover to said output shaft in an infinitely variable-speed transmitting manner, wherein said mechanical power transmitting device has a plurality of columns of planetary gear trains connected to a power input shaft directly connected to the prime mover, and said static hydraulic power transmitting device has a variable displacement type hydraulic pump driven by power from said power input shaft and a hydraulic motor unit driven by said pump to output power thereof to one of the planetary gear trains of said mechanical power transmitting device, characterized in that said mechanical power transmitting device is provided with three shafts concentrically arranged in three-piece fashion with respect to a concentric direction, including said power input shaft, an intermediate shaft and said output shaft; that said power input shaft is provided with a forward-rotation and a reverse-rotation input means in which forward-rotation and reverse-rotation planetary gear devices are concentrically arranged and effective to change the input rotating direction of the power of the prime mover to a forward rotating direction and a reverse rotating direction for selectively outputting power to the intermediate shaft; that said intermediate shaft is provided with a power transmitting system including said intermediate shaft, a planetary gear transmitting system containing said planetary gear trains arranged on said intermediate shaft concentrically thereto, and a planetary differential gear for connecting output sides of the respective planetary gear trains contained in the planetary gear transmitting system to said output shaft through a plurality of columns of planetary gear elements arranged concentrically with respect to said intermediate shaft; that said static hydraulic power transmitting device is provided with a gear train connecting an output shaft of the hydraulic motor unit to a planetary gear element of said planetary differential gear; and that the planetary gear transmitting system on said intermediate shaft is provided with clutch means for driving the output shaft only by the planetary differential gear operated by the static hydraulic power transmitting device in one driving mode, and clutch means for selecting both change of a rotational direction performed by said forward and reverse input means and a change in speed which is performed by the power transmitting system including the intermediate shaft, the planetary gear transmitting system and the planetary differential gear, whereby a forward- and reverse-rotation input means is provided and the entire mechanical power transmitting device is arranged on a single axis.

2. A mechanical - hydraulic transmission according to claim 1, characterized in that an input side of the power transmitting system including said intermediate shaft is connected to an output side of the forward- and reverse-rotation input means of said power input shaft through an associated clutch means; that the planetary gear transmitting system provided concentrically on the intermediate shaft includes said plurality of planetary gear trains; and that one of the planetary gear trains is connected through another clutch means capable of connecting/intercepting the output from said forward- and reverse-rotation input means to provide both forward- and rearward-movement having a plurality of speed ratios by combination of forward- and reverse-rotation switching clutches and speed-gear-ratio switching clutches.

3. A mechanical - hydraulic transmission according to claim 1, characterized in that said planetary differential gear includes a first differential planetary gear train of double planetary gear type and a second differential planetary gear train of single planetary gear type; that a carrier of said first differential planetary gear train is connected to a sun gear of the second differential planetary gear train and the output shaft of said hydraulic motor unit; that an annular gear of the first differential planetary gear train is connected to a carrier of the second differential planetary gear train; that a sun gear of the first differential planetary gear train is connected to an output side of said planetary gear transmitting system which is arranged concentrically on the intermediate shaft; that a carrier of the second differential planetary gear train is connected to an output side of the intermediate shaft; and that an annular gear of the second differential planetary gear train is connected to said output shaft.

\* \* \* \* \*